Aug. 24, 1965
W. H. SUTTON
3,202,130
TRAVELING FEED HOPPER
Filed Oct. 14, 1963
2 Sheets-Sheet 1
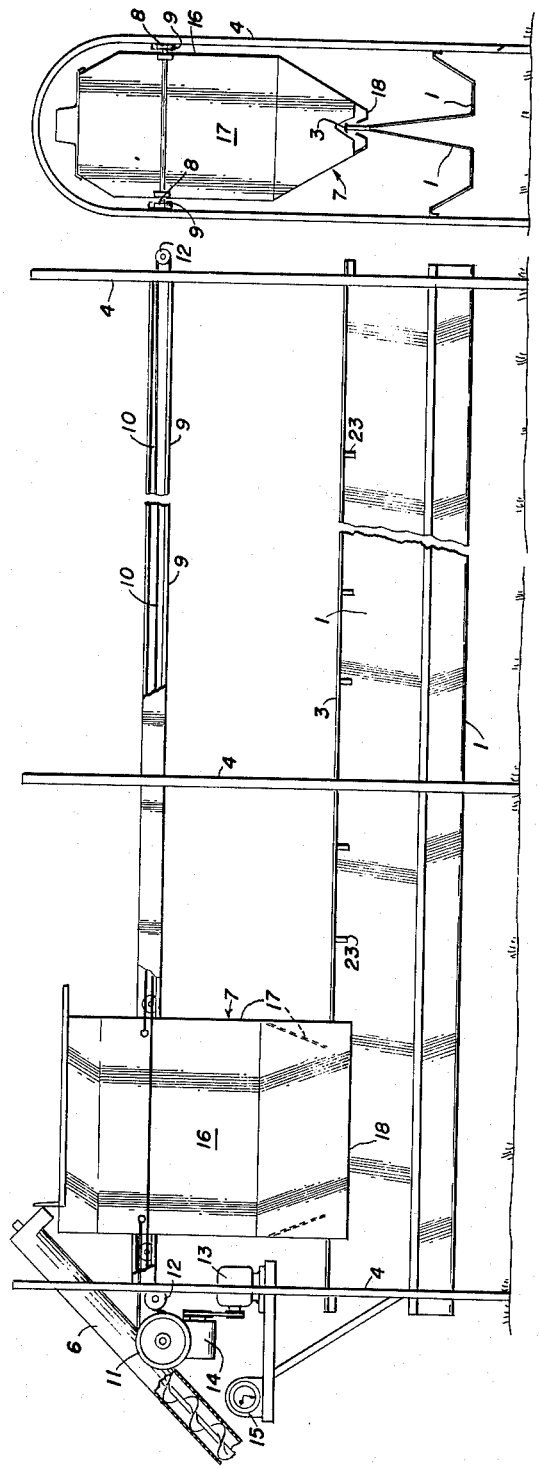
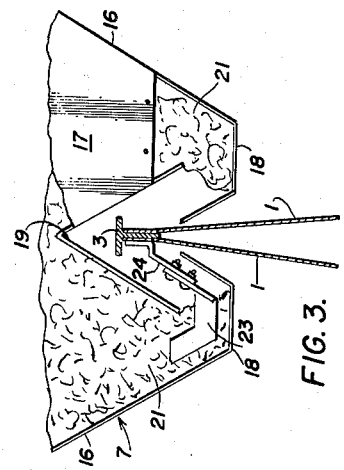
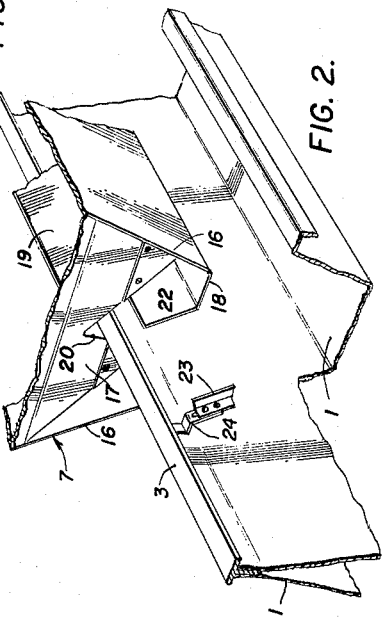
WILLIAM H. SUTTON
INVENTOR.
BY *Herbert J. Brown*
ATTORNEY Aug. 24, 1965     W. H. SUTTON     3,202,130
TRAVELING FEED HOPPER
Filed Oct. 14, 1963     2 Sheets-Sheet 2
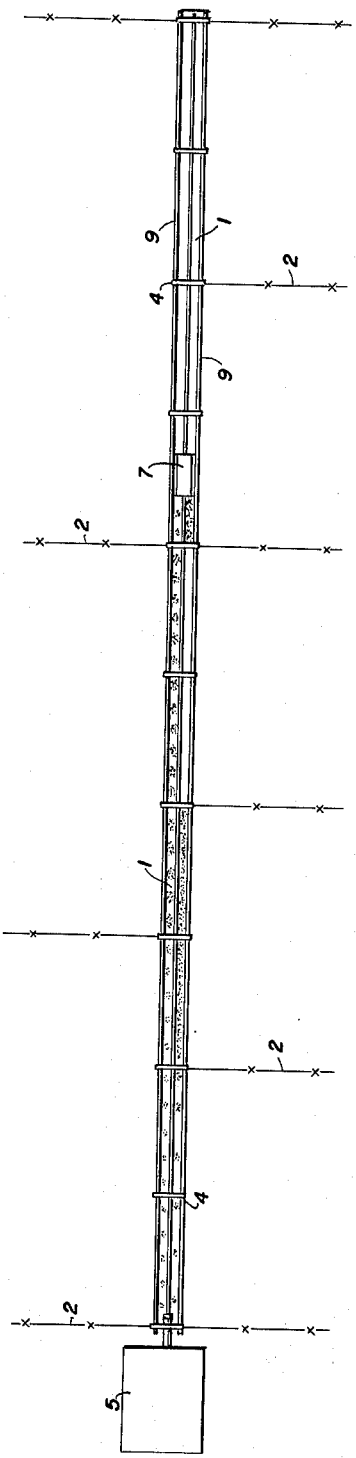
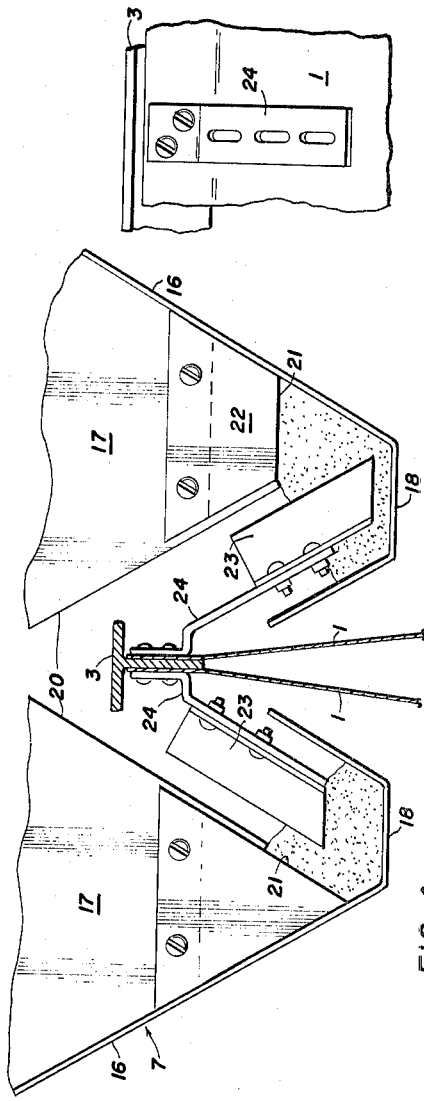
WILLIAM H. SUTTON
INVENTOR.
BY Herbert J. Brown
ATTORNEY

United States Patent Office 3,202,130
Patented Aug. 24, 1965

3,202,130
TRAVELING FEED HOPPER
William H. Sutton, Rte. 1, Box 213A, Keller, Tex.
Filed Oct. 14, 1963, Ser. No. 315,776
6 Claims. (Cl. 119—51.11)

This invention relates to a traveling feed hopper, and it concerns more particularly an apparatus for feeding animals automatically in measured amounts at predetermined time intervals which comprises, in combination, an elongated feed trough which may be advantageously arranged in the open and may traverse a plurality of adjoining pens each having tracks whereby it is supported above the feed trough and having means whereby it is propelled longitudinally thereof in opposite directions at predetermined time intervals, means for supplying feed material to said hopper in one of its operative positions, and means on said feed trough in selected predetermined positions spaced longitudinally thereof engageable with the feed in said hopper as the hopper is advanced longitudinally relative to said feed trough to displace feed material therefrom.

The invention contemplates apparatus as described in which said hopper has an adjustable, restricted bottom opening substantially coextensive with its length and has an open ended, horizontally extending delivery chute immediately below said openings positioned above said feed trough and aligned longitudinally therewith, and in which said last mentioned means consists of a plurality of fixed blades each having an adjustable support whereby it is adjustable vertically above said feed trough and extending laterally and downwardly from its support adapted to traverse said delivery chute as the hopper is advanced longitudinally relative to said feed trough, to thereby displace feed material from said delivery chute.

In one form of the invention a pair of elongated feed troughs may be arranged in parallel, side by side relation to each other and a single traveling feed hopper may be arranged to serve both of said feed troughs, as hereinafter described.

It has been determined experimentally that in the feeding of animals, specifically cattle, the feed material is best utilized, from the standpoint of the ratio of the amount of feed material consumed to the amount which the animals fed have increased in weight during a given time, when the animals are fed at frequent intervals, the length of time and the total consumption of feed material being the same.

An object of this invention is to provide an apparatus for feeding animals in measured amounts at predetermined time intervals which is fully automatic and which does not require the attendance of an operator, and which may be advantageously employed in the open for feeding comparatively large numbers of animals which are not necessarily of the same kind and size and which may require different amounts of the same material.

The invention will be readily understood by referring to the following description and the accompanying drawing, in which:

FIGURES 1 and 1A are longitudinal and transverse elevational views, respectively, of an automatic feeding apparatus embodying the invention in which a pair of elongated feed troughs which are arranged in parallel side by side relation to each other are served by the same traveling feed hopper.

FIGURE 2 is a fragmentary perspective view on an enlarged scale showing portions of the feed troughs, the restricted openings in the bottom of the hopper, the delivery chutes below said openings, and means on one of the feed troughs engageable with the contents of said hopper as the hopper is advanced longitudinally relative to said feed troughs to displace feed material therefrom.

FIGURE 3 is a fragmentary transverse sectional view on an enlarged scale showing portions of the feed troughs, the downwardly diverging internal baffles which with the downwardly converging opposite side walls of the hopper form the restricted bottom openings therein and one of the downwardly converging end walls of the hopper which are adjustable vertically as hereinafter described whereby said bottom openings are adjustable, and showing said delivery chutes positioned below said openings and one of said blades in one of its operative positions as it traverses the corresponding delivery chute to thereby displace feed material therefrom.

FIGURE 4 is a view on an enlarged scale similar to FIGURE 3 showing the hopper filled with a more finely divided feed material and showing a pair of mutually interchangeable plates having different vertical dimensions selectively and removably connected to the lower portions of one of the downwardly converging end walls of the hopper whereby said end wall is adjustable vertically to thereby adjust said restricted bottom openings of the hopper, and showing two of said vertically adjustable blades in different selected positions relative to their supports whereby they are adjustable vertically.

FIGURE 5 is a fragmentary elevational view on an enlarged scale showing a portion of one of the feed troughs and showing an adjustable support for one of said blades; and FIGURE 6 is a diagrammatic top plan view illustrating the manner in which the apparatus of the invention may be used advantageously, showing the apparatus in association with a plurality of fences which extend in opposite directions from opposite sides thereof and which define between them feed lots of different sizes each adapted to be served by said apparatus.

Referring to FIGURES 1, 1A and 6 of the drawing, the apparatus of the invention includes a pair of elongated feed troughs, each designated generally by the numeral 1, which are arranged in the open in parallel side by side relation to each other and which traverse a plurality of adjoining pens, one side of each of which is formed by said feed troughs 1 and two opposite sides of each of which are formed by two of a plurality of fences, each indicated generally by the numeral 2, which extend in opposite directions from opposite sides of the feed troughs 1.

As shown best in FIGURES 1A and 4, the feed troughs 1 have their two adjacent sides, which extend upwardly above their opposite sides, connected to opposite edges of an elongated T bar 3 which is coextensive with the length of the feed troughs 1, and have their opposite sides connected to a series of longitudinally spaced supporting members 4, each of which is of inverted U shape and which may be formed of bent pipe, whereby the feed troughs 1 are supported above the ground.

A comparably large bin 5, which may contain a quantity of feed material and which, as shown in FIGURE 6, is positioned adjacent one end of the feed troughs 1, has a screw conveyor 6 operatively connected thereto and arranged to supply feed material to the top of a traveling feed hopper as hereinafter described, indicated generally by the numeral 7, in the position of the hopper 7 illustrated in FIGURE 1.

As shown in FIGURES 1 and 1A, the hopper 7 has two pairs of wheels 8 positioned forwardly and rearwardly thereof whereby it is supported on tracks 9 above the feed troughs 1. The tracks 9 are supported on opposite sides of the supporting members 4. A conventional single monorail, not shown, would serve the same purpose.

The hopper 7 is propelled longitudinally of the feed troughs 1 in opposite directions at predetermined time intervals by a pair of cables 10, each of which is connected at its ends to one side of the hopper 7 and is strung over one of two drive pulleys 11 and one of two pairs of idler pulleys 12 positioned adjacent opposite ends of the feed troughs 1. The drive pulleys 11 are driven by a reversible electric motor 13 having speed reducing gears 14 and a timing device 15 operatively connected thereto.

The hopper 7 is generally rectangular and has two opposite sides 16 and two opposite ends 17 which extend vertically for distances corresponding to substantial portions of the height of the hopper 7. The lower portions of the sides 16 and the ends 17 converge downwardly and inwardly towards each other, the sides 16 extending downwardly below and longitudinally beyond the lower extremities of the ends 17 and each forming one side of a pair of delivery chutes 18 as hereinafter described.

A pair of downwardly diverging internal baffles 19, which extend longitudinally of the hopper 7, centrally thereof, and communicate at their ends with corresponding openings 20 of inverted V shape in the lower extremities of the ends 17, to which they are connected, form with said downwardly converging portions of the sides 16 and the ends 17 a pair of restricted openings 21 in the bottom of the hopper 7.

The delivery chutes 18, each of which is positioned below one of the restricted openings 21 and above one of the feed troughs 1, are arranged in parallel spaced apart relation to each other and in longitudinal alignment with the respective feed troughs 1, the connected sides of which extend upwardly between the delivery chutes 18 and are straddled by the baffles 19.

As shown in FIGURE 4, a pair of mutually interchangeable end plates 22 having different vertical dimensions are selectively and removably connected to the lower extermities of the ends 17, forming downward extensions thereof, whereby the restricted openings 21 in the bottom of the hopper 7 are adjustable.

The delivery chutes 18 extend laterally inwardly below the respective baffles 19, as shown in FIGURES 3 and 4, and a plurality of blades 23, which may be of different shapes as illustrated and each of which has an adjustable support 24, shown in FIGURE 5, whereby it is adjustable vertically, are removably connected to the T bar 3 and the adjacent sides of the respective feed troughs 1 in selected predetermined positions spaced longitudinally thereof, extend laterally and downwardly from their supports and are adapted to traverse the corresponding delivery chutes 18, as the hopper 7 is advanced longitudinally relative to the feed troughs 1, to thereby displace feed material from the delivery chutes 18.

In the operation, when it is desired to feed animals of various kinds and sizes in the several pens defined by the feed troughs 1 and the fences 2, the traveling feed hopper 10 is filled with feed material from the bin 5 by operation of the screw conveyor 6, and selected blades 23 are adjustably connected to certain of the supports 24 opposite said pens in predetermined vertical adjustment relative to the respective delivery chutes, as illustrated in FIGURES 4 and 5, after which the motor 14 is started and the traveling feed hopper 10 is advanced longitudinally of the feed troughs 1, first in one direction and then the other, according to a predetermined time cycle as determined by the timing device 15. The hopper 10 feeds as it moves in either direction.

Greater or lesser amounts of feed material are displaced from the respective delivery chutes 18 in accordance with the size, shape and location of the several blades 23 as the blades are traversed by the chutes 18 in response to longitudinal movement of the traveling feed hopper 7 relative to the feed troughs 1 as above described, according to the vertical setting or adjustment of the blades 23 relative to the corresponding chutes 18.

As illustrated in FIGURES 3 and 4, the amount of feed material which is delivered to the feed troughs 1 by displacement of such material from the delivery chutes 18 as described is determined also by the size of the restricted openings 21 in the bottom of the hopper, which in turn is determined by selective use or removal of the mutually interchangeable end plates 22, and by selective use of blades 23 of different types, which in turn is dependent on the size of said openings 21 and the kind of feed material which is being handled.

The invention is not limited to the exemplary construction herein shown and descibed, but may be made in various ways within the scope of the appended claims.

What is claimed is:

1. Apparatus for feeding animals automatically in measured amounts at predetermined time intervals comprising, in combination, an elongated feed trough which may be arranged in the open and may traverse a plurality of adjoining pens each having one or more animals therein, a traveling feed hopper having track means whereby it is supported above the feed trough and having means whereby it is propelled longitudinally thereof at predetermined time intervals, means for supplying feed material to said hopper in one of its operative positions, means on said feed trough in selected predetermined positions spaced longitudinally thereof engageable with the feed material of said hopper as said hopper is advanced longitudinally relative to said feed trough to displace feed material therefrom, said hopper having a restricted bottom opening substantially coextensive with its length and having an open ended, horizontally extending delivery chute immediately below said opening positioned above said feed trough and aligned longitudinally therewith, and said last mentioned means consisting of a plurality of fixed blades each having a support whereby it extends laterally and downwardly from its support and adapted to traverse said delivery chute as the hopper is advanced longitudinally relative to said feed trough, to thereby displace feed material from said delivery chute.

2. Apparatus for feeding animals automatically in measured amounts at predetermined time intervals comprising, in combination, an elongated feed trough which may be arranged in the open and may traverse a plurality of adjoining pens each having one or more animals therein, a traveling feed hopper having track means whereby it is supported above the feed trough and having means whereby it is propelled longitudinally thereof at predetermined time intervals, means for supplying feed material to said hopper in one of its operative positions, means on said feed trough in selected predetermined positions spaced longitudinally thereof engageable with the feed material of said hopper as said hopper is advanced longitudinally relative to said feed trough to displace feed material therefrom, said hopper having an adjustable restricted bottom opening substantially coextensive with its length and having an open ended, horizontally extending delivery chute immediately below said opening positioned above said feed trough and aligned longitudinally therewith, and said last mentioned means consisting of a plurality of fixed blades each having an adjustable support whereby it is adjustable vertically above said feed trough and extending laterally and downwardly from its support and adapted to traverse said delivery chute as the hopper is advanced longitudinally relative to said feed trough, to thereby displace feed material from said delivery chute.

3. Apparatus for feeding animals automatically in measured amounts at predetermined time intervals comprising, in combination, a pair of elongated feed troughs arranged in parallel side by side relation to each other, a traveling feed hopper having tracks whereby it is supported above the feed troughs and having means whereby it is propelled longitudinally thereof at predetermined time intervals, means for supplying feed material to said hopper in one of its operative positions, and means on said feed troughs in selected predetermined positions spaced longitudinally thereof engageable with the contents of said hopper as said hopper is advanced longitudinally relative to said feed troughs to displace feed material therefrom, said hopper having a pair of adjustable, restricted bottom openings substantially coextensive with its length and having a pair of open ended, horizontally extending delivery chutes immediately below said openings positioned above said feed troughs, respectively, and said last mentioned means consisting of a plurality of fixed blades each connected to a support therefor above one of said feed troughs, adjacent one side thereof, in predetermined vertical adjustment relative thereto, and extending laterally and downwardly from its support adapted to traverse one of said delivery chutes as the hopper is advanced longitudinally relative to said feed troughs to thereby displace feed material from said delivery chute.

4. The structure of claim 3, the hopper having downwardly converging opposite side and end portions, the sides extending downwardly below and longitudinally beyond the lower extremities of the ends and each forming one side of one of said delivery chutes, and having a pair of downwardly diverging internal baffles extending longitudinally of the hopper, centrally thereof, and communicating at their ends with corresponding openings of inverted V shape in the lower extremities of the ends of said hopper to which they are connected, and forming with said downwardly converging side and end portions said restricted openings in the bottom of the hopper.

5. The structure of claim 4, said delivery chutes extending laterally inwardly below said downwardly diverging baffles, respectively, and the adjacent sides of said feed troughs being connected at their upper edges and extending upwardly between said delivery chutes and being straddled by said downwardly diverging baffles an having said vertically adjustable supports for said blades connected thereto.

6. The structure of claim 5, and a plurality of pairs of mutually interchangeable end plates having different vertical dimensions, the end plates of one pair being selectively and removably connected to the lower extremities of said opposite end portions between one of said side portions and one of said downwardly diverging baffles above one of said delivery chutes and forming downward extensions of said end portions whereby one of said restricted openings in the bottom of the hopper above said one of said delivery chutes is adjustable.

References Cited by the Examiner
UNITED STATES PATENTS

| | | | |
|---|---|---|---|
| 2,536,621 | 1/51 | Arnold | 119—51 |
| 2,601,057 | 6/52 | Roberts et al. | 119—52 |
| 2,685,863 | 8/54 | Martin | 119—51 |
| 2,786,448 | 3/57 | McMaster | 119—52 |
| 2,791,200 | 5/57 | Palmer | 119—52 |

SAMUEL KOREN, *Primary Examiner.*
ALDRICH F. MEDBERY, *Examiner.*